United States Patent
Ding et al.

(10) Patent No.: US 6,704,159 B2
(45) Date of Patent: Mar. 9, 2004

(54) AUTOMATIC ACOUSTIC MANAGEMENT SYSTEM FOR A DISC DRIVE

(75) Inventors: MingZhong Ding, Singapore (SG); KianKeong Ooi, Singapore (SG); YangQuan Chen, Singapore (SG); Jack Ming Teng, Singapore (SG); ShuangQuan Min, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 395 days.

(21) Appl. No.: 09/810,337

(22) Filed: Mar. 16, 2001

(65) Prior Publication Data

US 2002/0006010 A1 Jan. 17, 2002

Related U.S. Application Data

(60) Provisional application No. 60/212,546, filed on Jun. 20, 2000.

(51) Int. Cl.[7] .............................................. G11B 5/596
(52) U.S. Cl. .................................. 360/78.06; 360/78.07
(58) Field of Search ............................... 360/75, 78.06, 360/78.07; 369/32.1, 43

(56) References Cited

U.S. PATENT DOCUMENTS

| | | |
|---|---|---|
| 4,675,761 A | 6/1987 | Ashbee et al. |
| 4,937,689 A | 6/1990 | Seaver et al. |
| 4,956,831 A * | 9/1990 | Sarraf et al. ............. 360/78.04 |

(List continued on next page.)

FOREIGN PATENT DOCUMENTS

| | | |
|---|---|---|
| EP | 0308062 B1 | 10/1992 |
| EP | 0543654 B1 | 10/1998 |
| GB | 2303732 A | 2/1997 |
| WO | WO 93/26007 | 12/1993 |
| WO | WO 99/45535 | 9/1999 |
| WO | WO 00/03389 | 1/2000 |

OTHER PUBLICATIONS

IBM, "High–Speed/Low–Power Selectable Optical File," IBM Technical Disclosure Bulletin, IBM (US), No. 316, (Sep. 7, 1990).

*Primary Examiner*—David Hudspeth
*Assistant Examiner*—K. Wong
(74) *Attorney, Agent, or Firm*—David K. Lucente; Derek J. Berger

(57) ABSTRACT

A method of implementing an automatic acoustic management feature for a disc drive includes receiving an acoustic/performance compromising factor from a host, tuning disc drive performance by applying the factor to a control parameter to generate a modified control parameter, and executing a loop for controlling a disc drive operation using the modified control parameter. In another embodiment, a disc drive has a base, a rotatable disc, an actuator assembly with an arm for carrying a head in transducing relation to the disc in response to a control signal, a receiver for receiving an acoustic/performance compromising factor, and a controller that monitors the position of the arm and generates the control signal. The controller executes a seeking control loop having a control parameter modified by applying a compromising factor to the parameter to tune the acoustic performance of the drive.

17 Claims, 11 Drawing Sheets

U.S. PATENT DOCUMENTS

| | | | |
|---|---|---|---|
| 4,967,293 A | 10/1990 | Aruga et al. | |
| 5,264,771 A | 11/1993 | Kawauchi | |
| 5,282,100 A | 1/1994 | Tacklind et al. | |
| 5,291,110 A | 3/1994 | Andrews, Jr. et al. | |
| 5,450,252 A | 9/1995 | Kanda | |
| 5,465,034 A | 11/1995 | Andrews, Jr. et al. | |
| 5,475,545 A | 12/1995 | Hampshire et al. | 360/78.06 |
| 5,657,179 A | 8/1997 | McKenzie | 360/78.06 |
| 5,668,680 A | 9/1997 | Tremaine | 360/78.07 |
| 5,696,647 A * | 12/1997 | Phan et al. | 360/78.07 |
| 5,726,825 A | 3/1998 | Phan et al. | |
| 5,751,513 A | 5/1998 | Phan et al. | |
| 5,760,992 A | 6/1998 | Phan et al. | 360/78.07 |
| 5,880,587 A | 3/1999 | Annis et al. | |
| 5,880,902 A | 3/1999 | Yu et al. | 360/77.04 |
| 5,901,009 A | 5/1999 | Sri-Jayantha et al. | |
| 5,973,871 A | 10/1999 | Dunn et al. | |
| 5,982,570 A | 11/1999 | Koizumi et al. | |
| 5,986,426 A | 11/1999 | Rowan | |
| 6,008,640 A | 12/1999 | Tan et al. | |
| 6,011,373 A | 1/2000 | McConnell et al. | |
| 6,011,667 A | 1/2000 | Dunn et al. | |
| 6,013,995 A | 1/2000 | Kim | |
| 6,031,684 A | 2/2000 | Gregg | |
| 6,038,096 A | 3/2000 | Zhang et al. | |
| 6,052,252 A | 4/2000 | Kim | |
| 6,101,065 A | 8/2000 | Alfred et al. | |
| 6,111,720 A | 8/2000 | Clare et al. | |
| 6,115,205 A | 9/2000 | Waugh et al. | |
| 6,148,240 A | 11/2000 | Wang et al. | |
| 6,151,182 A | 11/2000 | Koizumi et al. | |
| 6,169,382 B1 | 1/2001 | McKenzie et al. | 318/561 |
| 6,178,060 B1 | 1/2001 | Liu | |
| 6,195,222 B1 | 2/2001 | Heminger et al. | |
| 6,256,163 B1 * | 7/2001 | Schmidt et al. | 360/78.09 |
| 6,314,473 B1 | 11/2001 | Singer et al. | |

\* cited by examiner

AUTOMATIC ACOUSTIC MANAGEMENT SYSTEM FOR A DISC DRIVE

RELATED APPLICATION

This application claims the benefit of U.S. Provisional Application Ser. No. 60/212,546, filed on Jun. 20, 2000 under 35 U.S.C. §119(e).

FIELD OF THE INVENTION

The present invention relates to the field of mass storage devices. More particularly, this invention relates to a system for implementing automatic acoustic management in disc drives.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so the data can be successfully retrieved from and written to the disc surface. A microprocessor controls most of the operations of the disc drive as well as passing the data back to the requesting computer and accepting data from a requesting computer for storing to the disc.

The transducer head is typically placed on a small ceramic block, referred to as a slider, that is aerodynamically designed to fly over the disc as the disc is rotated under the influence of a spindle motor. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the transducer head away from the disc. At the same time, the air rushing past the cavity or depression in the ABS produces a negative pressure area. The negative pressure or suction counteracts the pressure produced at the rails. The slider is also attached to a load spring which produces a force on the slider that is directed toward the disc surface. The various forces equilibrate so that the slider flies over the surface of the disc at a particular desired fly height. The fly height is the distance between the disc surface and the transducing head, which is typically equal to the thickness of the air lubrication film. This film eliminates the friction and the resulting wear that would occur if the transducing head and the disc were to be in mechanical contact during the disc rotation. In some disc drives, the slider passes through a layer of lubricant rather than flying over the surface of the disc.

Information representative of data is stored on the surface of the storage disc. Disc drive systems read and write information stored on tracks on the storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto the track by writing information representative of data onto the storage disc. Similarly, reading data from a storage disc is accomplished by positioning the read/write head above a target track and reading the stored material on the storage disc. To write on or read from different tracks, the read/write head is moved radially across the tracks to a selected target track. The data is divided or grouped together on the tracks. Some disc drives have a multiplicity of concentric circular tracks. In other disc drives, a continuous spiral is one track on one side of drive. Servo feedback information is used to accurately locate the transducer head. The actuator assembly is moved to the required position and held very accurately during read or write operations using the servo information.

The actuator is rotatably attached to a shaft via a bearing cartridge which generally includes one or more sets of ball bearings. The shaft is attached to the base of the disc drive, and may also be attached to the top cover of the disc drive. A yoke is attached to the actuator. A voice coil is attached to the yoke at one end of the rotary actuator. The voice coil is part of a voice coil motor (VCM) used to rotate the actuator and the attached transducer(s). A permanent magnet is attached to the base and the cover of the disc drive. The VCM which drives the rotary actuator comprises the voice coil and the permanent magnet. The voice coil is attached to the rotary actuator and the permanent magnet is fixed on the base. The yoke is generally used to attach the permanent magnet to the base and to direct the flux of the permanent magnet. Since the voice coil sandwiched between the magnet and the yoke assembly is subjected to magnetic fields, electricity can be applied to the voice coil to drive the voice coil so as to position the transducer(s) at a target track.

Two of the ever constant goals of disc drive designers are to increase the data storage capacity of disc drives, and to decrease the amount of time needed to access the data. To increase storage capacity, current disc drives have increased numbers of tracks per inch (TPI). Put simply, current disc drives squeeze more tracks onto the same size disc. Decreasing the amount of time needed to access the data can be thought of as increasing the speed at which data is retrieved. Increasing the speed at which data is retrieved is very desirable. Any decreases in access time increase the speed at which a computer can perform operations on data. When a computer system is commanded to perform an operation on data that must be retrieved from disc, the time needed to retrieve the data from the disc is often the bottleneck in the operation. When data is accessed from a disc more quickly, more transactions can generally be handled by the computer in a particular unit of time.

A rotating disc data storage device uses a servo system to perform two basic operations: track seeking and track following. Track seeking refers to the ability of the disc drive and the servo system to move the read/write transducer head of the disc drive from an initial track to a target track from which data is to be read, or to which data is to be written. The settling of the transducer head at the target track is referred to as seek settling. Track following, which is performed after the head has been aligned with a target track, refers to the ability of the disc drive and the servo system to maintain the read/write head positioned over the target track. Note that, to effectively perform track seeking and track following in a disc drive with increased TPI, the servo open loop bandwidth of the system must also be pushed or increased.

While performance indices of disc drives, such as access times, WinBench scores, etc., are important concerns for customers of disc drives, another important concern is the acoustic level of disc drives. Normally, the acoustics of a disc drive includes two portions: an idle mode portion and a seeking mode portion. In the idle mode portion, the source of the acoustics is the spindle motor which rotates the disc. The idle mode acoustics form an acoustic baseline for the disc drive. In the seeking mode portion, the source of the acoustics is the VCM. The VCM seeking acoustics are added to the baseline. Customers generally prefer disc drives with low acoustics.

In practice, there exists a trade-off between the performance indices and the acoustic levels of a disc drive. In particular, to achieve faster disc drive performance, the acoustic levels of a disc drive will be increased (i.e., made noisier). Conversely, to achieve improved acoustic levels, disc drive performance will be sacrificed. The optimal trade-off between performance and the acoustic levels of a disc drive will be different for different customers. For example, in the consumer electronics market, some customers may be relatively sensitive to the acoustic levels of disc drives, and may prefer a quieter disc drive over a noisier disc drive even if it requires a sacrifice in the disc drive performance. On the other hand, other customers may be relatively insensitive to acoustic levels, and may prefer a higher-performance disc drive over a lower-performance disc drive even if it requires an increased level of acoustics. The sensitivity of still other customers to the acoustic level of disc drives may change over time. For example, a particular customer may prefer a quieter disc drive when listening to music that is stored in a digital file on a disc drive, but may prefer a higher-performance disc drive when running a spread sheet or a database program.

To meet the needs and preferences of disc drive customers, an Automatic Acoustic Management (AAM) feature set has been proposed and been added to the American National Standard for Information Systems—AT Attachment with Packet Interface—6 (ANSI ATA/ATAPI-6) specification. This standard specifies the AT Attachment Interface between hosts and storage devices, and provides a common attachment interface for system manufacturers, integrators, software suppliers, and suppliers of intelligent storage devices. The AAM feature set will allow a host (e.g., a host computer) to select an acoustic management level for a disc drive. By using the AAM feature set, different customers (or a single customer at different times) will have the freedom to select a desired balance between the acoustic levels and the performance indices of a disc drive. In particular, by using the AAM feature set, an acoustic management level for a disc drive will be specified by a command that is sent from the host to a disc drive controller. This command will specify the desired acoustic level of the disc drive. In response, the controller will control the operation of the disc drive in a manner such that the desired acoustic level will be achieved.

Therefore, there is a need for a method and apparatus for implementing an automatic acoustic management (AAM) feature for a disc drive that allows a host to specify a balance between the performance and acoustic levels of the drive. There is also a need for a method and apparatus for implementing an AAM feature for a disc drive such as that proposed for the ATA/ATAPI-6 standard. There is also a need for a method and apparatus for implementing an AAM feature for a disc drive which is efficient in terms of its memory and/or processing requirements. There is a further need for a method and apparatus for implementing an AAM feature in a disc drive seeking operation, which can be performed for each seek or for a plurality of seeks.

SUMMARY OF THE INVENTION

In accordance with one embodiment of the present invention, a method of implementing an automatic acoustic management (AAM) feature for a disc drive includes the steps of receiving an acoustic/performance compromising factor from a host, and tuning performance of a disc drive according to the compromising factor. The step of tuning includes applying the compromising factor to at least one control parameter for the disc drive to generate at least one modified control parameter. The method also includes executing a control loop for controlling an operation of the disc drive, wherein the control loop uses the at least one modified control parameter.

In one embodiment, the executing step includes executing a seeking control loop for controlling a seeking operation of the disc drive. The receiving step and the tuning step may be performed before starting each seek, in which case the executing step is performed for controlling each seek using the modified control parameter(s) that was generated using the compromising factor received before starting that seek. The receiving and tuning steps may also be performed before starting a plurality of seeks, in which case the executing step is performed for controlling the seeks using the modified control parameter(s) that was generated using the compromising factor received before starting the seeks. The control parameter(s) may include a position gain, with the tuning step generating a modified position gain (e.g., by multiplying the position gain and the squared compromising factor). The control parameter(s) may also include a velocity gain, with the tuning step generating a modified velocity gain (e.g., by multiplying the velocity gain and the compromising factor). The control parameter(s) may also include a control effort limit value, with the tuning step generating a modified control effort limit value (e.g., by multiplying the control effort limit value and squared compromising factor). The control loop may include a velocity profile generator for generating a desired velocity based on a difference between an actual and a target position, with the tuning step modifying the desired velocity (e.g., by multiplying the desired velocity and the compromising factor). This generator generates the desired velocity using a single velocity profile stored in memory, this velocity profile used for different values of the compromising factor.

In accordance with another embodiment of the invention, a disc drive includes a base, a disc rotatably attached to the base, an actuator assembly including an arm for carrying a transducer head in a transducing relation with respect to the disc in response to a control signal, a receiver for receiving an acoustic/performance compromising factor, and a controller coupled to the actuator assembly and receiver for monitoring an actual position signal for the arm and for generating the control signal. The controller executes a control loop for controlling seeking which has at least one control parameter that is modified by applying a received compromising factor to the at least one control parameter to tune acoustic performance of the drive.

In embodiments of this disc drive, a control parameter(s) may be modified for each seek by a compromising factor received before starting that seek, or may be modified for a plurality of seeks by a compromising factor received before starting the plurality of seeks. The control loop may include a first difference element, a velocity profile generator, an applying element, a second difference element, a velocity gain element, and a limit element. The first difference element may determine a position error between the actual position signal and a target position. The velocity profile generator may generate a desired velocity from the position error, and introduce a position gain that is modified by application of the received compromising factor. The applying element may apply the compromising factor to the desired velocity to generate a modified desired velocity (e.g., by multiplying the desired velocity and the compromising factor). The second difference element may determine a velocity error between the modified desired velocity and an estimated velocity for the arm. The velocity gain element may provide a velocity gain to the velocity error to generate an unlimited control signal, with the velocity gain being modified by application of the received compensation factor. The limit element may limit the unlimited control signal to generate the control signal, with the limit also being modified by application of the received compromising factor.

In accordance with another embodiment of the present invention, an apparatus for implementing an AAM feature for a disc drive includes means for receiving an acoustic/performance compromising factor, and means for tuning performance of a disc drive according to the acoustic/performance compromising factor. The means for tuning applies the compromising factor to at least one control parameter to generate at least one modified control parameter for the disc drive.

These and various other features as well as advantages which characterize the present invention will be apparent to a person of ordinary skill in the art upon reading the following detailed description and reviewing the associated drawings.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and that structural changes may be made without departing from the scope of the invention.

In this application, a method and apparatus for implementing an automatic acoustic management (AAM) feature in disc drives are described. The method and apparatus allow a host to send a command to a disc drive controller that specifies a trade-off or a compromise between the performance and acoustics of the disc drive. The tradeoff is characterized by an acoustic/performance compromising factor. The method and apparatus may be used, for example, to implement the AAM feature that has been proposed for the ATA/ATAPI-6 standard. The method and apparatus are efficient in terms of memory since only one velocity profile table for seeking is stored, and is efficient in terms of processing resources since only relatively simple calculations are performed to generate seeking control parameters. Each command sent by the host can be used for only one seek, or can be used for multiple seeks.

Figure 1:
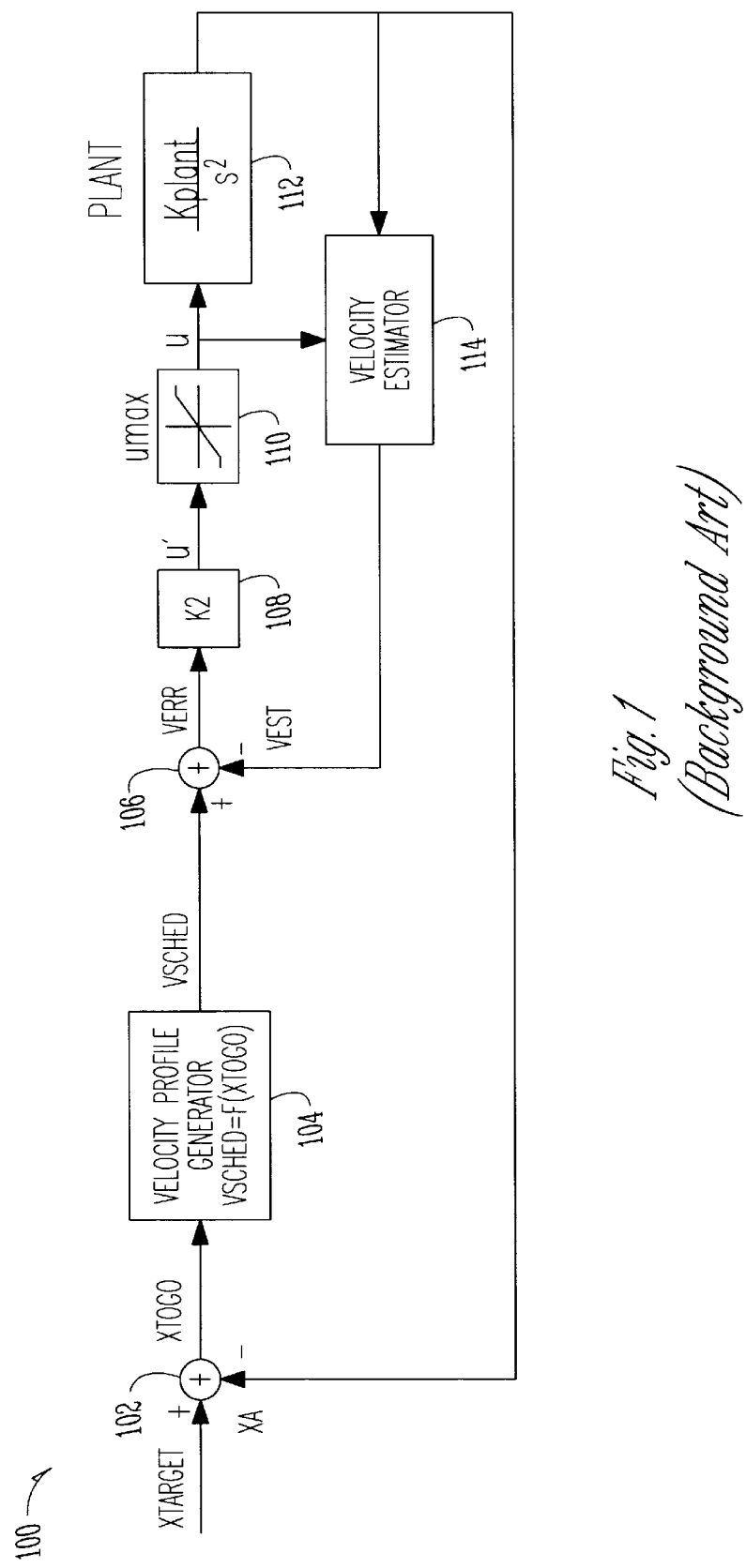
FIG. 1 is a schematic representation of the Proximate Time-Optimal Servo-Mechanism (PTOS) loop used for controlling seeking in a conventional disc drive.

Referring to FIG. 1, a Proximate Time-Optimal Servo-Mechanism (PTOS) loop 100 used for controlling seeking in a conventional disc drive is shown. Control loop 100 includes a first difference element 102, a velocity profile generator 104, a second difference element 106, a velocity gain element 108, a limit element 110, a servo amplifier and plant 112, and a velocity estimator 114. A seeking operation from a current track to a target track is performed by commanding the actual VCM velocity to follow a seeking velocity profile. For seeking, the actual position of the VCM actuator will be defined as $X_a$, and the target position will be defined as $X_{Target}$. For every actual position $X_a$ of the VCM actuator, the first difference element 102 calculates a distance $X_{Togo}$ away from the target track as $X_{Togo}=X_{Target}-X_a$. Thus, $X_{Togo}$ represents the distance "to go" to reach the target track. For every entry of $X_{Togo}$, velocity profile generator 104 generates a desired or scheduled velocity $V_{sched}$. Second difference element 106 subtracts an estimated velocity $V_{est}$ from the desired velocity $V_{sched}$ to determine a velocity error $V_{err}$. Velocity gain element 108 provides a velocity gain K2 to velocity error $V_{err}$ to generate an unlimited control signal u':

$$u'=K2*V_{err}=K2*(V_{sched}-V_{est}) \qquad (1)$$

Unlimited control signal u' is then limited by limit element 110 to a maximum value of $u_{max}$ to generate a control signal u, which is applied to plant 112. Control signal u represents the actual control effort (e.g., calculated VCM current) used to drive the VCM actuator to seek towards the target track. Velocity estimator 114 uses control signal u and actual position $X_a$ (as a feedback) to generate estimated velocity $V_{est}$.

The velocity profile provided by velocity profile generator 104 is typically generated off-line, and is stored in a read-only memory (ROM) as a lookup table, with $X_{Togo}$ being used as an index input and $V_{sched}$ being the output signal. In PTOS, the velocity profile generator function $f(\bullet)$ is expressed by the following equations:

$$V_{sched} = f(XTogo) = \begin{cases} \dfrac{K_1}{K_2} XTogo & \text{for } |XTogo| \le Xlinear \\ sgn(XTogo) \cdot \sqrt{2\alpha \cdot u_{max} \cdot Kplant \cdot XTogo} - \dfrac{u_{max}}{K_2} & \text{for } |XTogo| > Xlinear \end{cases} \quad (2)$$

where $K_1$, represents the position gain, $K_2$ represents the velocity gain, the positive factor $\alpha$ is referred to as the acceleration discount factor and is less than 1 (0<$\alpha$<1), and $K_{plant}$ represents the gain of the VCM plant. As indicated by equations (2), the seeking velocity profile includes two portions: a square root portion and a linear portion. The square root portion provides a velocity control loop; thus, only the velocity gain $K_2$ is used. In contrast, during the linear portion, both of the gains (i.e., $K_1$ and $K_2$) are used. When the actuator is far away from the target (i.e., when $|X_{Togo}|>X_{Linear}$), the velocity profile is a square root function; when the actuator is near the target (ie., when $|X_{Togo}| \leq X_{Linear}$), the velocity profile is a straight line. The value of $X_{Togo}$ at the transition point between these equations is defined as $X_{Linear}$.

To guarantee continuity for the transition from the square root portion to the linear portion during a seek, there exist two constraints behind equations (2):

$$K_2 = \sqrt{2\dfrac{K_1}{\alpha \cdot Kplant}} \quad (3)$$

$$XLinear = \dfrac{u_{max}}{K_1}$$

The constraints exist to avoid discontinuity in $V_{sched}$ as $|X_{Togo}|$ passes through $X_{Linear}$ during a seek and to insure that u' will equal $u_{max}$ when $|X_{Togo}|$ passes through $X_{Linear}$ (thereby preventing limit element 110 from cutting off any excess portion of u').

Figure 2:
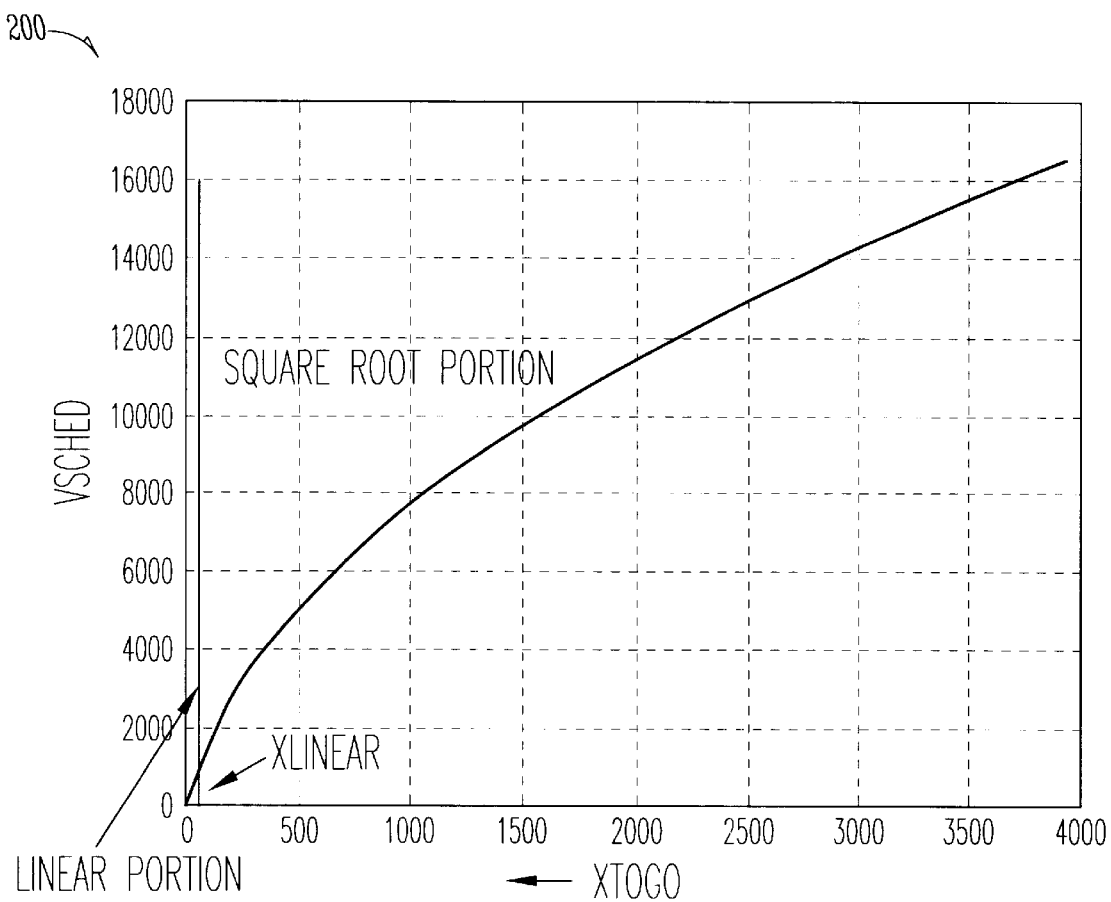
FIG. 2 is a graph illustrating a typical PTOS velocity profile, including a square root portion and a linear portion which have a transition point at XLinear.

Referring to FIG. 2, a graph 200 illustrates a typical PTOS velocity profile that is generated by velocity profile generator 104. This profile includes both a square root portion and a linear portion which are joined at a transition point $X_{Linear}$.

As indicated by FIGS. 1 and 2, a disc drive using PTOS control loop 100 will control seeking according to the velocity profile generated by generator 104. Thus, such a disc drive has no mechanism for allowing a host to specify a desired balance between the performance indices and the acoustic levels of the disc drive, and has no mechanism for implementing an automatic acoustic management (AAM) feature for a disc drive such as the AAM feature proposed for the ATA/ATAPI-6 specification. In the figures that follow below, a disc drive having such capabilities is described.

Figure 3:
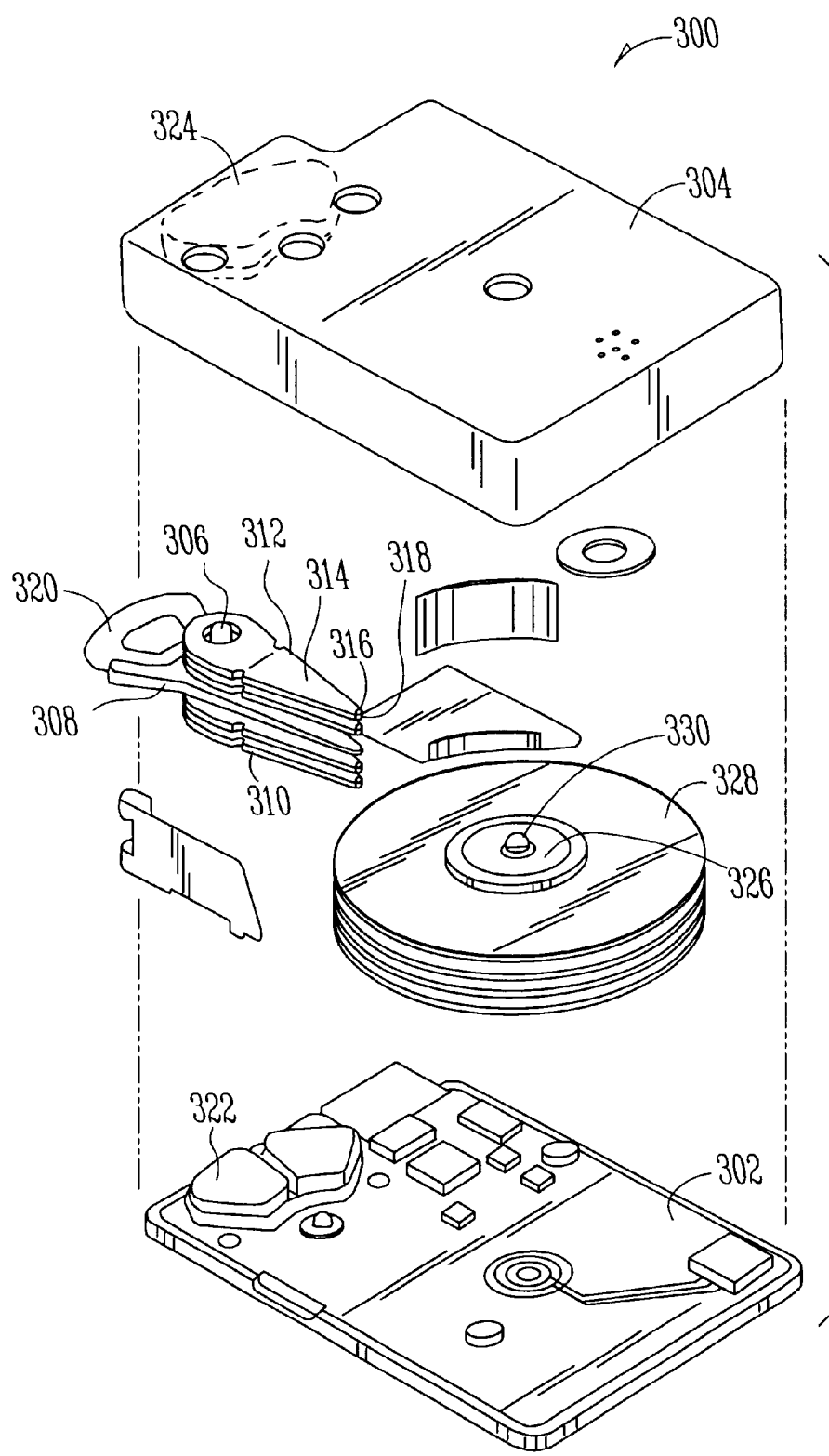
FIG. 3 is an exploded view of a disc drive which implements automatic acoustic management in accordance with one embodiment of the present invention.

Referring to FIG. 3, a disc drive 300 which allows a host to specify a balance between the performance and acoustics of the drive includes a housing having a base 302 and a cover 304 which form a disc enclosure. Rotatably attached to base 302 on an actuator shaft 306 is a rotary actuator assembly 308. Rotary actuator assembly 308 includes a comb-like structure 310 having a plurality of arms 312. Attached to separate arms 312 on comb 310 are load beams or load springs 314. Load beams or load springs 314 are also referred to as suspensions. Attached at the end of each load spring 314 is a slider 316 which carries a magnetic transducer 318. Slider 316 and transducer 318 form what is often referred to as the head. It should be noted that many sliders have one transducer 318 and that is what is shown in the figures. It should also be noted that the present system is equally applicable to sliders having more than one transducer, such as what is referred to as a magneto-resistive (MR) head in which one transducer is generally used for reading and another transducer is generally used for writing. On the end of rotary actuator assembly 308 opposite load springs 314 and sliders 316 is a voice coil 320.

Attached within the disc enclosure between base 302 and cover 304 is a first magnet 322 and a second magnet 324. As shown, first and second magnets 322 and 324 are associated with the base 302 and cover 304, respectively. First magnet 322, second magnet 324 and voice coil 320 are the key components of a voice coil motor (VCM) that applies a force to actuator assembly 308 to rotate actuator assembly 308 about actuator shaft 306. Also mounted to base 302 is a spindle motor. The spindle motor includes a rotating portion called a spindle hub 326. In this particular disc drive, the spindle motor is located within spindle hub 326. In FIG. 3, a number of discs 328 are shown as attached to spindle hub 326. In other disc drives, a single disc or a different number of discs from that shown in FIG. 3 may be attached to the hub. The system described herein applies equally to disc drives having a plurality of discs and disc drives having only a single disc, and is also equally applicable to disc drives with spindle motors which are within hub 326 or under hub 326. Discs 328 are rotatably attached to base 302 through a shaft 330 (and by hub 326). Actuator assembly 308 carries transducer 318 in a transducing relation with respect to one of discs 328 for reading and writing data to that disc 328 during operation of drive 300.

In one embodiment, the method and apparatus for implementing an AAM feature disclosed herein is used with disc drive 300, which has a particular rotary actuator assembly. In other embodiments, the method and apparatus is used with other mechanical configurations of disc drives having rotary or linear actuation. Also, the method and apparatus is useful in all types of disc drives including hard disc drives, zip disc drives, floppy disc drives and any other type of disc drives. Thus, while the discussion below focuses on a particular type of disc drive, it should be understood that the present invention is not limited to this particular type drive.

Figure 4:
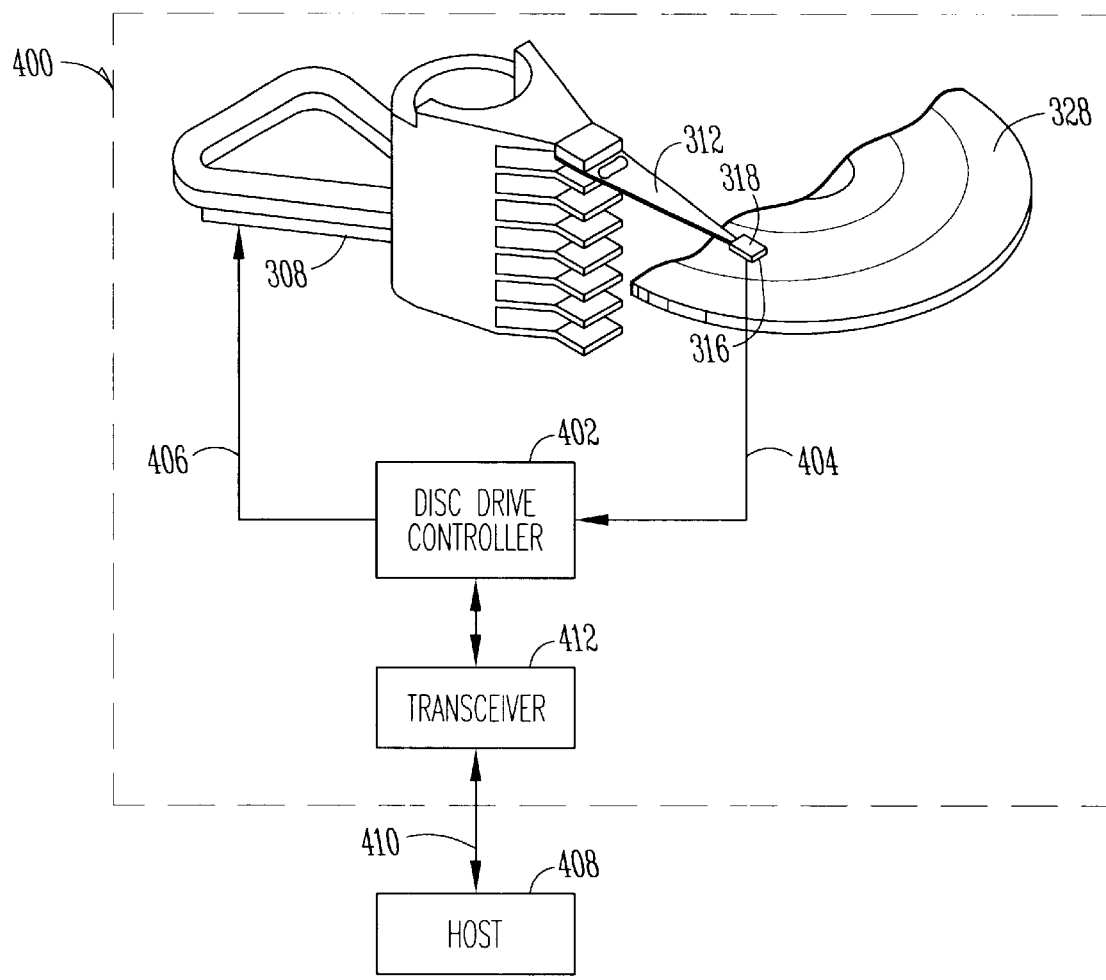
FIG. 4 is a schematic representation of a servo control system of the disc drive shown in FIG. 3, wherein the servo control system communicates with a host.

FIG. 4 is a schematic representation of a servo control system 400 for disc drive 300, which includes a disc drive controller 402. Controller 402 is coupled to transducer 318 to receive input signals 404 representing positions of transducer 318. Controller 402 is also coupled to actuator assembly 308 to provide signals to control the rotation of assembly 308, thereby also controlling the position of transducer 318. Thus, system 400 provides closed-loop control over the position of transducer 318. By providing appropriate control signals 406 to actuator assembly 308, controller 402 performs both track seeking and track following functions. In the track seeking function, the read/write head including transducer 318 is moved from an initial track on disc 328 into radial alignment with a target track on disc 328 from which data is to be read or to which data is to be written. In the track following function, which is performed when the head reaches a selected track, the read/write head is maintained in radial alignment with the selected track defined on disc 328 as disc 328 rotates, so that transducer 318 can read data from, or can write data to, the selected track.

As also shown in FIG. 4, disc drive controller 402 is capable of bidirectional communications with a host 408

(e.g., a host computer) via input/output lines 410 and a transmitter/receiver or transceiver 412. Via transceiver 412, controller 402 is configured to receive information from host 408 which represents data to be written to disc 328, and to transmit information to host 408 that has been read from disc 328. Disc drive controller 402 is also configured to receive a command from host 408 that specifies a desired acoustic management level. This command notifies controller 402 about the acoustic level for disc drive 300 that is desired by host 408.

In one embodiment, controller 402 receives the acoustic management level command by executing AT interface firmware. This firmware also causes a variable to be passed to the disc drive servo controller. This variable is referred to herein as an acoustic/performance compromising factor since it specifies a desired trade-off or compromise between the performance indices and acoustic levels of the disc drive. Alternatively, other hardware and/or software may be used to receive the command from host 408 and to pass the compromising factor to the disc drive servo controller.

In one embodiment, the acoustic/performance compromising factor is a normalized acoustic factor $\beta$, which has been normalized to have a value of between 0 and 1 (i.e., $\beta \in (0,1]$). The smaller the value of $\beta$, the quieter the disc drive will be (at the sacrifice of lower performance). Conversely, the larger the value of $\beta$, the noisier the disc drive will be (with the benefit of higher performance). Thus, in operation, host 408 sends a command to controller 402 which indicates a normalized acoustic factor $\beta$ of close to 0 (e.g., 0.1) to specify very quiet but slow performance, and a normalized acoustic factor $\beta$ of 1 to specify very fast but noisy performance.

It is to be understood, however, that the acoustic/performance compromising factor can take on a number of different forms. For example, a normalized acoustic factor $\gamma$ may be defined with values between 0 and 1, with smaller values indicating noisier and faster drive performance and larger values indicating quieter and slower performance (i.e., the opposite of $\beta$). For another example, the compromising factor may have non-normalized values (e.g., values between 0 and 100). For yet another example, the compromising factor may specify an acoustic management level, such as a maximum, intermediate or minimum acoustic emanation level (corresponding to a maximum, intermediate or minimum performance level, respectively). In each of these examples, the compromising factor may be used in place of the normalized acoustic factor $\beta$ in the discussion below, with appropriate modifications, or may be converted into a normalized acoustic factor the same as or similar to $\beta$ before being used. For example, the maximum, intermediate and minimum acoustic emanation levels discussed above could be assigned normalized acoustic factor values of 1.0, 0.5 and 0.1, respectively, and the normalized values could then be used in the same manner as $\beta$, as discussed below. For convenience, in the following discussion, the compromising factor is assumed to be the normalized acoustic factor $\beta$ ($\beta \in (0, 1]$). However, other forms of the acoustic/performance compromising factor may also be used, and the present invention is not intended to be limited to any particular form.

Figure 5:
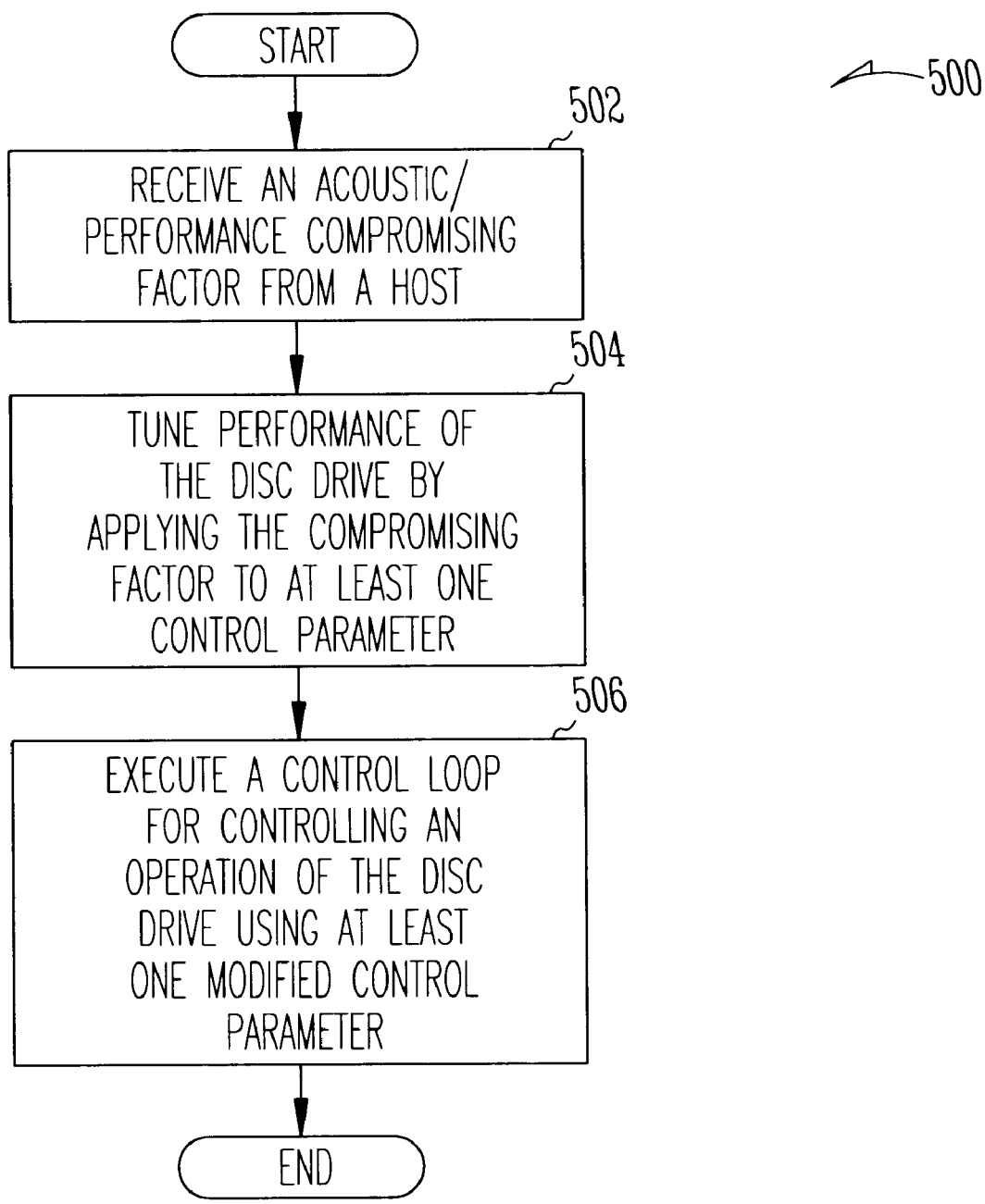
FIG. 5 is a flow chart showing a method of implementing an automatic acoustic management (AAM) feature in the disc drive illustrated by FIGS. 3 and 4.

Referring to FIG. 5, a method 500 of implementing an AAM feature for disc drive 300 according to one embodiment of the present invention includes receiving an acoustic/performance compromising factor from host 408 (step 502), tuning the performance of disc drive 300 by applying the compromising factor to at least one control parameter for disc drive 300 to generate at least one modified control parameter (step 504), and executing a control loop for controlling an operation of disc drive 300 using the at least one modified control parameter (step 506). An embodiment of method 500 for implementing AAM during a seek is now described.

In one embodiment, steps 502 and 504 include receiving a normalized acoustic factor $\beta$ from host 408 before starting each seek, and using the received normalized acoustic factor $\beta$ to tune the performance of disc drive 300 during that seek by modifying several seeking control parameters of disc drive 300 as follows:

$$u'_{max} = \beta^2 \cdot u_{max}$$

$$K'_1 = \beta^2 \cdot K_1$$

$$K'_2 = \beta \cdot K_2$$

Thus, the position gain $K_1$, the velocity gain $K_2$, and the maximum value $U_{max}$ are all modified by application of the normalized acoustic factor $\beta$ received from host 408. Therefore, in this embodiment, host 408 is capable of tuning the performance of disc drive 300 according to the normalized acoustic factor $\beta$ for each individual seek.

In another embodiment, steps 502 and 504 include receiving a normalized acoustic factor $\beta$ from host 408 before starting multiple seeks, and using the factor $\beta$ to tune the performance of disc drive 300 during those multiple seeks by modifying several seeking control parameters as shown in equations (4) above. For example, host 408 may send a command to disc drive 300 on system startup (e.g., as part of a startup routine) to specify a desired balance between the performance and acoustics of the disc drive, and that balance then is maintained until system shutdown, or until another such command is sent to disc drive 300. In another example, host 408 could send a command to the drive to specify a desired balance between the performance and acoustics of the drive at the request of an application or task being executed by the host, or in response to an input signal received from a user of the host (e.g., a computer operator) via an input device (e.g., a mouse, a keyboard, a switch, etc.).

Figure 6:
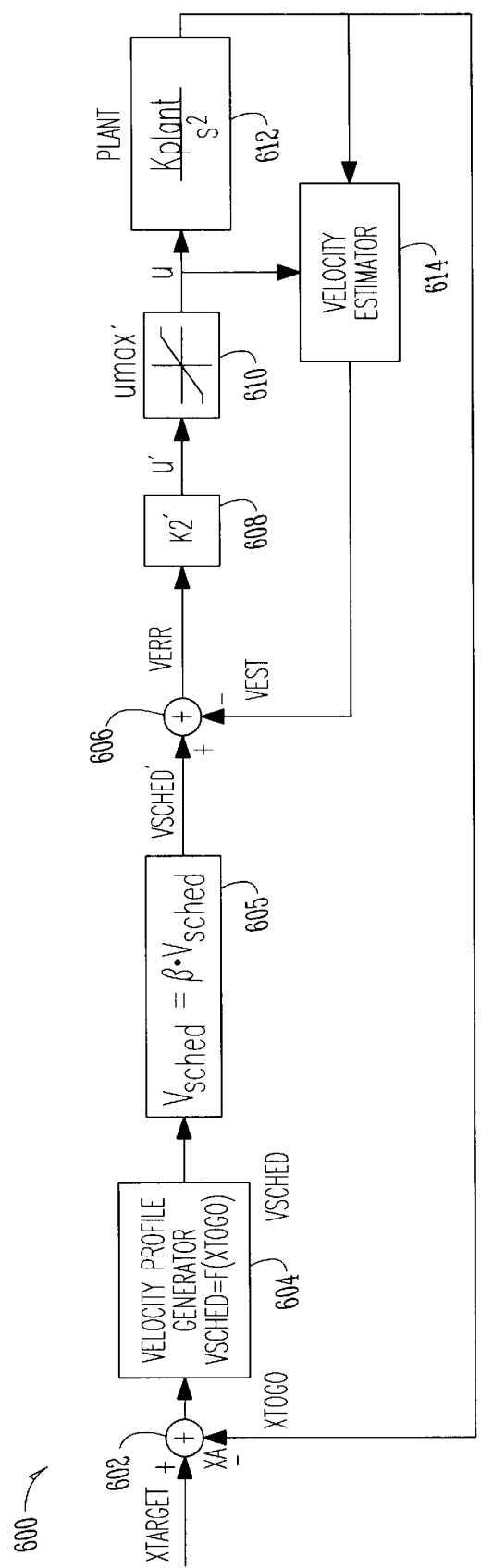
FIG. 6 is a schematic representation of a PTOS control loop for controlling seeking in a disc drive in accordance with one embodiment of the present invention.

Referring to FIG. 6, after modifying control parameters using equations (4), disc drive 300 executes (at step 506) a PTOS control loop 600 to control seeking. Control loop 600 is executed by controller 402. Control loop 600 includes a first difference element 602, a velocity profile generator 604, a compromising factor applying element 605, a second difference element 606, a velocity gain element 608, a limit element 610, a servo amplifier and plant 612, and a velocity estimator 614.

A seeking operation from a current track to a target track is performed by commanding the actual VCM velocity to follow a seeking velocity profile. For a seek, the actual position of the VCM actuator is defined as $X_a$ and the target position is defined as $X_{Target}$. For every actual position $X_a$ of the VCM actuator, difference element 602 calculates a distance $X_{Togo}$ away from the target track as $X_{Togo} = X_{Target} - X_a$. Thus, $X_{Togo}$ represents the distance "to go" to reach the target track. For every entry of $X_{Togo}$, velocity profile generator 604 generates a desired velocity $V_{sched}$. Applying element 605 applies normalized acoustic factor $\beta$ to the desired velocity $V_{sched}$ to generate a modified desired velocity $V_{sched}'$ (e.g., by multiplying $V_{sched}$ and $\beta$). Second difference element 606 subtracts an estimated velocity $V_{est}$ from the modified desired velocity $V_{sched}'$ to determine a velocity error $V_{err}$. Velocity gain element 608 applies velocity gain K2' to $V_{err}$ to generate unlimited control signal u':

$$u' = K2'^* V_{err} = K2'^*(V_{sched}' - V_{est}) \quad (5)$$

Unlimited control signal u' is then limited by limit element 610 to maximum value $u_{max}'$ to generate a control signal u, which is applied to plant 612. Control signal u represents the actual control effort (e.g., calculated VCM current) used to drive the VCM actuator to seek towards the target track. Velocity estimator 614 uses control signal u and actual position $X_a$ (as a feedback) to generate estimated velocity $V_{est}$.

The velocity profile provided by velocity profile generator 604 is generated off-line using equations (2), and is stored in a read-only memory (ROM) as a lookup table, with $X_{Togo}$ being used as an index input and $V_{sched}$ being the output signal. The calculations of the modified control parameters (i.e., the modified position gain $K_1'$, modified velocity gain $K_2'$, and modified maximum value $u_{max}'$) are thus performed to satisfy the constraints specified by equations (3) when control loop 600 is used. By combining equations (3) and (4), it can be seen that the transition point $X_{Linear}'$ between the square root and linear portions of the velocity profile of generator 604 is equal to the transition point $X_{Linear}$ between the square root and linear portions of the velocity profile of generator 104 (shown in FIG. 1). In other words:

$$X_{Linear}' = X_{Linear} \quad (6)$$

The transition point from the square root to the linear portion is thus unchanged.

Figure 7:
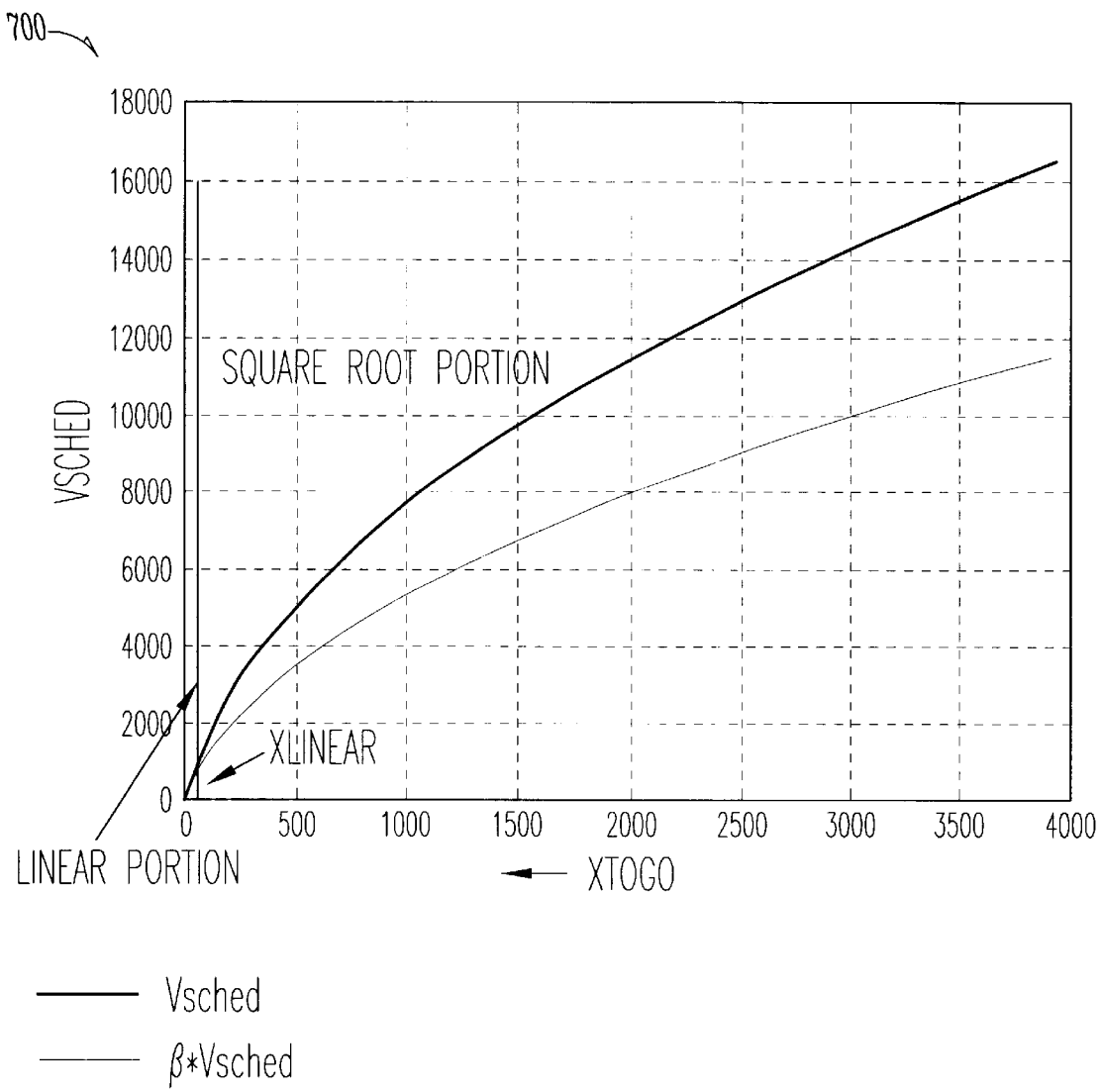
FIG. 7 is a graph illustrating a PTOS velocity profile for the loop of FIG. 6.

Referring to FIG. 7, a graph 700 illustrates the PTOS velocity profile that is generated by velocity profile generator 604 of FIG. 6. This profile includes a square root portion and a linear portion which are joined at transition point $X_{Linear}'$. Graph 700 illustrates both the desired velocity $V_{sched}$ that is output from generator 604 and the modified desired velocity $V_{sched}'$ output from applying element 605, where $V_{sched}' = \beta^* V_{sched}$. Thus, the modified scheduled velocity is lowered down by a factor of β.

If the normalized acoustic factor β=1, the modified control parameters (i.e., $K_1'$, $K_2'$ and $u_{max}'$) equal their unmodified values (i.e., $K_1$, $K_2$ and $u_{max}$, respectively), and the modified desired velocity $V_{sched}'$ equals its unmodified value of $V_{sched}$. Thus, in the special case where β=1, the operation of disc drive 300 with control loop 600 (FIG. 6) is the same as the operation of a disc drive with control loop 100 (FIG. 1).

By modifying the value of β, host 408 can select a desired balance between the performance and acoustic level of disc drive 300. For example, referring to FIG. 8, graphs 800 show a captured VCM current waveform for the same seek length but with different β values. In particular, the top graph shows a captured VCM current waveform with β=1.0 (i.e., which is equivalent to disabling the AAM), while the bottom graph shows a captured VCM current waveform with β=0.7. Each graph also shows a seeking window signal. From graphs 800, it can be seen that lowering β from 1.0 to 0.7 reduces the seeking current, while resulting in a sacrifice of the access time of the disc drive.

Figure 8:
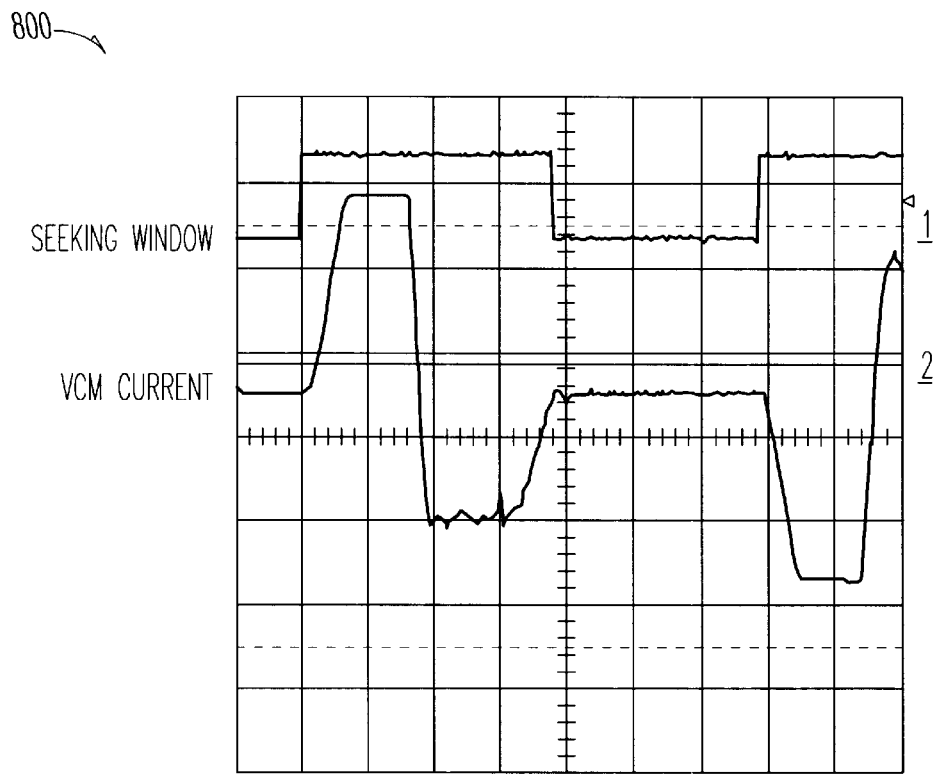
FIG. 8 are graphs illustrating a captured voice coil motor (VCM) current waveform for the same seek length using different values of an acoustic factor β.
Figure 8:
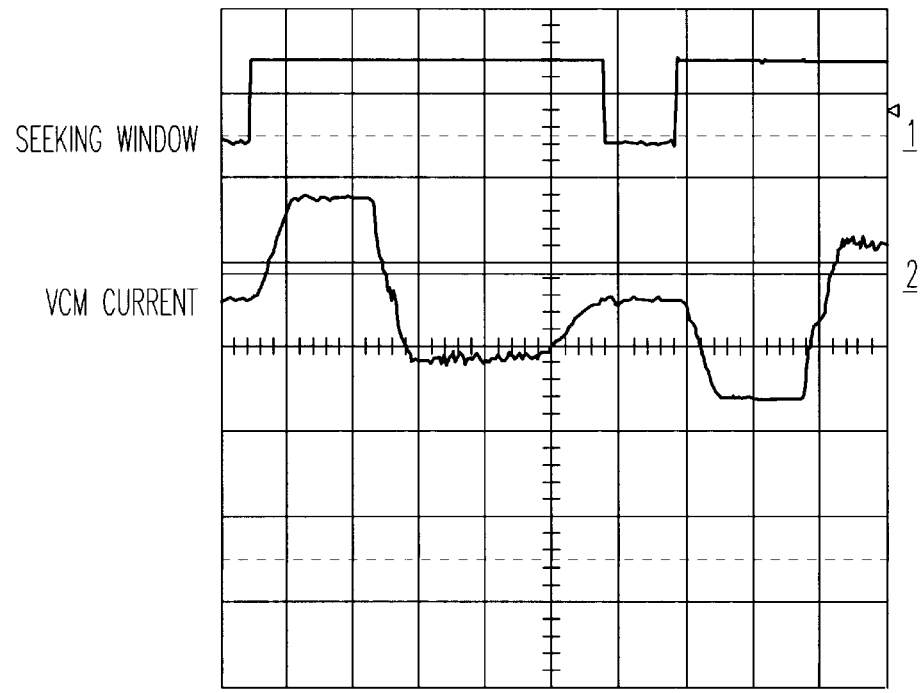

In graphs 800, the sacrifice in the access time is about 2 msec. Note that the access time is defined as the seeking time plus the settling time. The seeking time is defined as the duration of the seeking window, and the settling time is defined as the duration for the head to settle on the target track. Although the settling time is not shown in FIG. 8, the settling time is assumed to be the same for β=1.0 or 0.7 (and, in fact, the settling time for β=0.7 should be less than the settling time for β=1.0 due to less excitation). Since the difference in the duration of the seeking window in FIG. 8 is about 1 division, and the time base is 2 msec/division, the sacrifice in the access time caused by lowering β from 1.0 to 0.7 can be seen to be about 2 msec.

Figure 9:
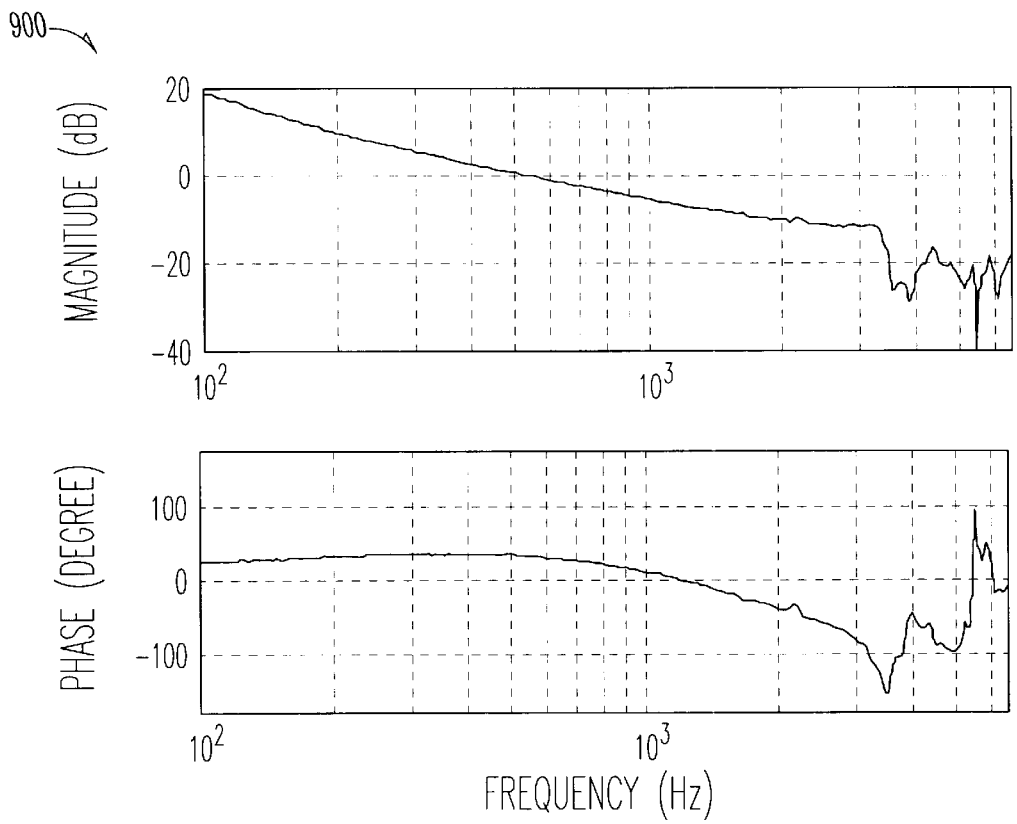
FIG. 9 are graphs illustrating PTOS seeking loop bode plots for different values of the acoustic factor β.
Figure 9:
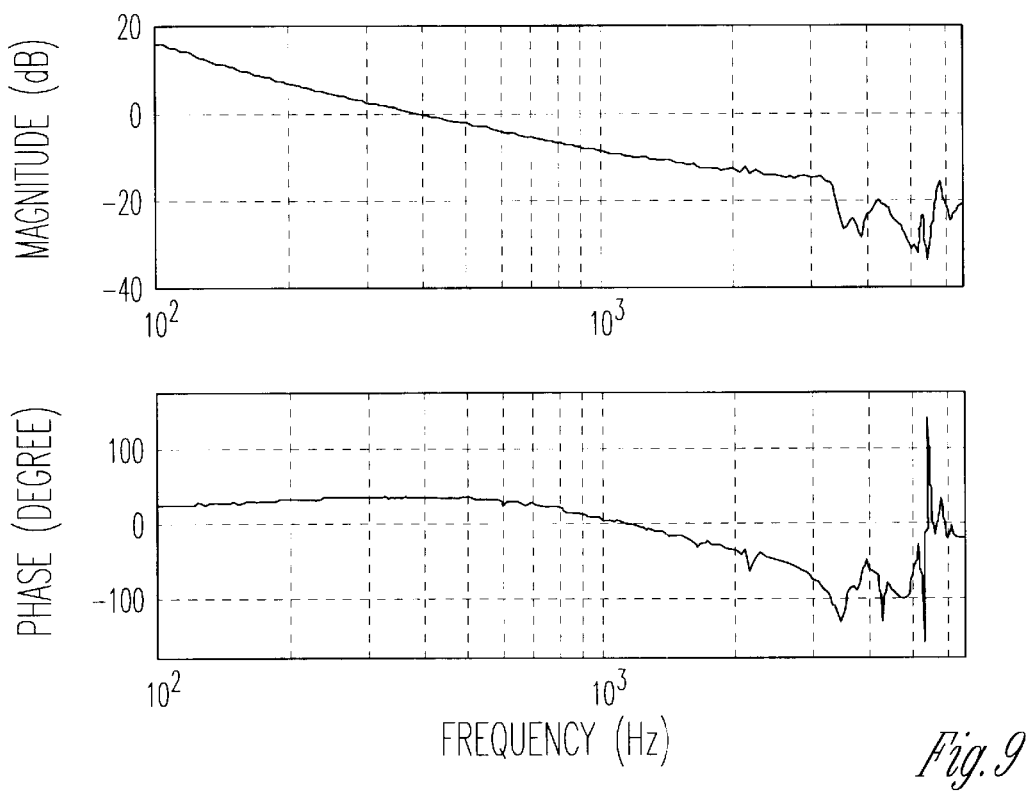

Referring to FIG. 9, graphs 900 illustrate the PTOS seeking loop bode plot for different values of acoustic factor β. In particular, the top graphs plot the gain and phase for β=1.0, while the bottom graphs plot the gain and phase for β=0.7. It can be seen that a lower normalized acoustic factor β will result in a lower open loop bandwidth, while the phase margin and the gain margin will not be degraded.

Figure 10:
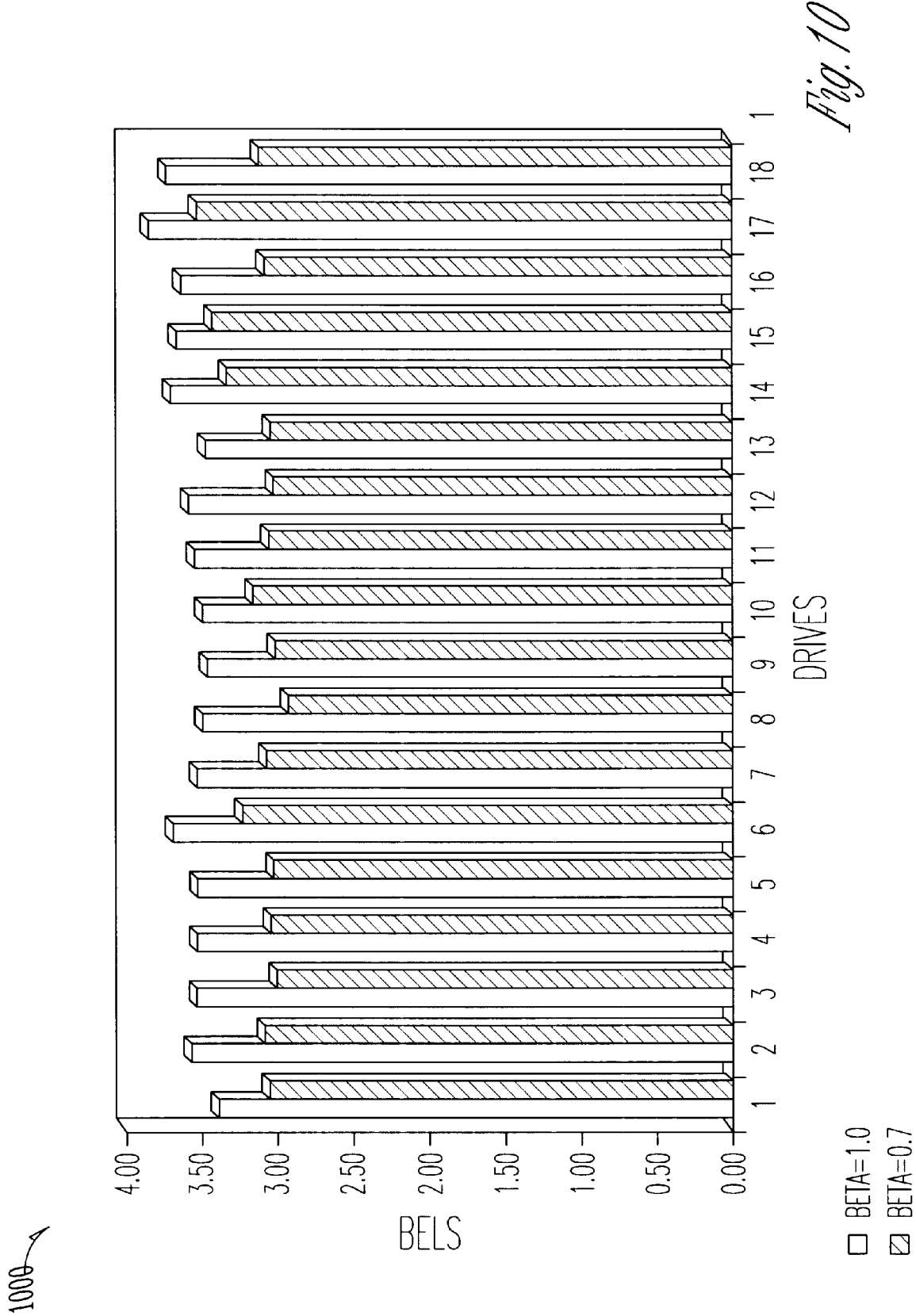
FIG. 10 is a bar graph illustrating measured values of sound power emanated by 18 disc drives which implement AAM in accordance with one embodiment of the present invention for different values of the acoustic factor β.

Referring to FIG. 10, a bar graph 1000 shows measured values of sound power for disc drives which implement AAM as shown above for different values of normalized acoustic factor β. For each of 18 disc drives, the left bar indicates the sound power with β=1.0, and the right bar indicates the sound power with β=0.7. The acoustic emanations for each of the disc drives were decreased by changing β from 1.0 to 0.7, with an average improvement in the acoustic level of 0.45 Bels.

Advantageously, the method and apparatus disclosed herein implement an AAM feature for disc drives, and can be used to implement the AAM feature set that has been proposed as part of the ATA/ATAPI-6 standard. The disclosed method and apparatus allow a host to specify a desired balance between the performance and acoustic level of the disc drives. A normalized acoustic factor β allows operation of the disc drives to be tuned continuously, or to be tuned at a particular point in time. The method and apparatus are efficient in terms of memory usage since only one velocity profile is stored in memory, and in terms of processing requirements since the various calculations that are performed are fast (e.g., multiplication operations, and not including square root operations). Thus, the disclosed method and apparatus are suitable for the implementation of AAM in disc drives designed for desktop use.

Figure 11:
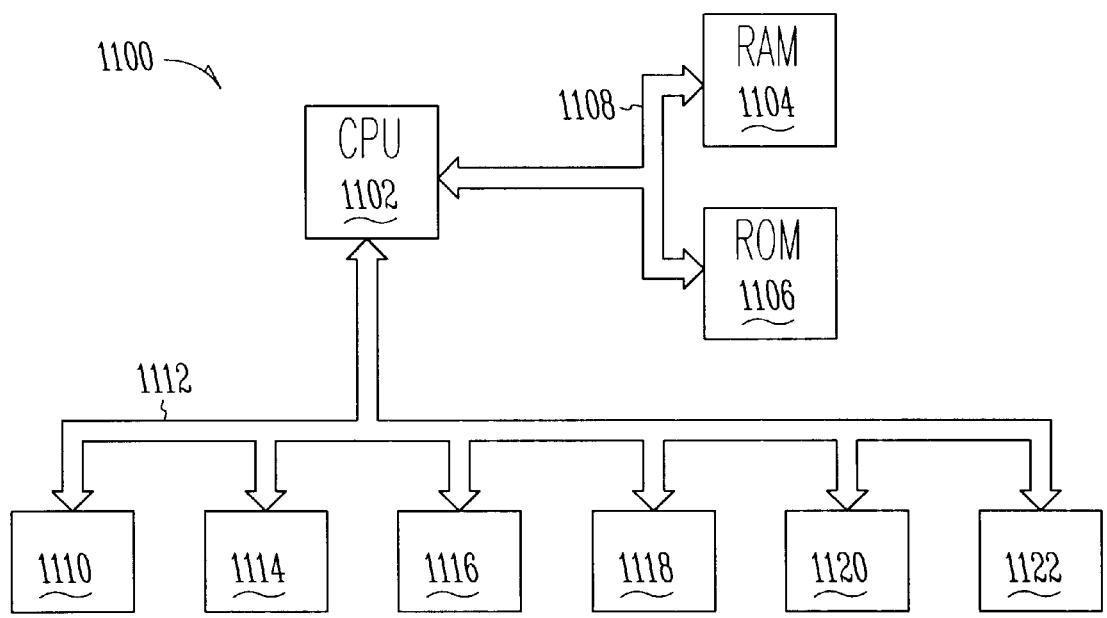
FIG. 11 is a schematic view of a computer or information handling system having one or more disc drives that implement the AAM feature described herein.

Referring to FIG. 11, a computer system 1100 includes one or more disc drives that implement an AAM feature in the manner discussed above. Computer system 1100, which may be referred to as an electronic system or as an information handling system, includes a central processing unit (CPU) 1102, a random access memory (RAM) 1104, a read only memory (ROM) 1106 and a system bus 1108 for communicatively coupling CPU 1102 with RAM 1104 and ROM 1106. System 1100 includes one or more disc drive devices 1110 (one shown in FIG. 11) which implements the AAM feature as described above, and an input/output (I/O) bus 1112 for communicatively coupling CPU 1102 with disc drive(s) 1110. Any type of disc drive may use the method for implementing the AAM feature described above. System 1100 may also include other peripheral devices, such as devices 1114–1122, attached to bus 1112. Devices 1114–1122 may include other disc drives, magneto optical drives, floppy disc drives, monitors, keyboards and other peripherals.

Conclusion

A method 500 of implementing an automatic acoustic management (AAM) feature for a disc drive 300 includes the steps of receiving an acoustic/performance compromising factor (e.g., normalized acoustic factor β) from a host 408, tuning performance of disc drive 300 according to the compromising factor by applying the compromising factor to at least one control parameter for disc drive 300 to generate at least one modified control parameter, and executing a control loop 600 to control an operation of disc drive 300 using the at least one modified control parameter.

In one embodiment, the executing step (step 506) includes executing a seeking control loop 600 for controlling a seeking operation of the disc drive 300. The receiving step (step 502) and the tuning step (step 504) may be performed before starting each seek, with the executing step (step 506) being performed for controlling each seek using the at least one modified control parameter that was generated using the compromising factor (e.g., $\beta$) received before starting the seek. The receiving step (step 502) and the tuning step (step 504) may also be performed before starting a plurality of seeks, with the executing step (step 506) performed for controlling the seeks using the at least one modified control parameter that was generated using the compromising factor (e.g., $\beta$) received before starting the seeks. The control parameter(s) may include a position gain K1, in which case the tuning step (step 504) may include generating a modified position gain K1' (e.g., K1'=$^2$*K1). The control parameter(s) may also include a velocity gain K2, in which case the tuning step (step 504) may include generating a modified velocity gain K2' (e.g., K2'=$\beta$*K2). The control parameter(s) may also include a control effort limit value $u_{max}$, in which case the tuning step (step 504) may include generating a modified control effort limit value (e.g., $u_{max}'=\beta^2*u_{max}$). The control loop 600 may include a velocity profile generator 604 for generating a desired velocity $V_{sched}$ based on a difference between an actual and a target position ($X_{Togo}=X_{Target}-X_a$), in which case the tuning step (step 504) may include modifying the desired velocity (e.g., $V_{sched}'=\beta*V_{sched}$). The velocity profile generator 604 that generates the desired velocity $V_{sched}$ uses a single velocity profile stored in a memory, and the single velocity profile is used for different values of the compromising factor.

It is to be understood that the above description is intended to be illustrative, and not restrictive. Many other embodiments will be apparent to those of ordinary skill in the art upon reviewing the above description. The scope of the present invention should, therefore, be determined with reference to the appended claims, along with the full scope of equivalents to which such claims are entitled.

What is claimed is:

1. A method of operating a disc drive for improved acoustic management, comprising steps of:
    (a) receiving an acoustic/performance compromising factor from a host;
    (b) tuning performance of a disc drive according to the compromising factor, the step of tuning including applying the compromising factor to at least one control parameter for the disc drive to generate at least one modified control parameter; and
    (c) executing a control loop for controlling an operation of the disc drive, the control loop using the at least one modified control parameter.

2. The method of claim 1, wherein the executing step (c) includes (c)(i) executing a seeking control loop for controlling a seeking operation of the disc drive.

3. The method of claim 2, wherein the receiving step (a) and the tuning step (b) are performed before starting each seek, and the executing step (c) is performed for controlling each seek using the at least one modified control parameter that was generated using the compromising factor received before starting that seek.

4. The method of claim 2, wherein the receiving step (a) and the tuning step (b) are performed before starting a plurality of seeks, and the executing step (c) is performed for controlling the seeks using the at least one modified control parameter that was generated using the compromising factor received before starting the seeks.

5. The method of claim 1, wherein the at least one control parameter includes a position gain, and the tuning step (b) includes (b)(i) generating a modified position gain.

6. The method of claim 5, wherein the generating step (b)(i) includes (b)(ii) squaring the compromising factor to obtain a squared compromising factor, and also includes (b)(iii) multiplying the position gain and the squared compromising factor.

7. The method of claim 1, wherein the at least one control parameter includes a velocity gain, and the tuning step (b) includes (b)(i) generating a modified velocity gain.

8. The method of claim 7, wherein the generating step (b)(i) includes (b)(ii) multiplying the velocity gain and the compromising factor.

9. The method of claim 1, wherein the at least one control parameter includes a control effort limit value, and the tuning step (b) includes (b)(i) generating a modified control effort limit value.

10. The method of claim 9, wherein the generating step (b)(i) includes (b)(ii) squaring the compromising factor to obtain a squared compromising factor, and also includes (b)(iii) multiplying the control effort limit value and squared compromising factor.

11. The method of claim 1, wherein the control loop includes a velocity profile generator for generating a desired velocity based on a difference between an actual and a target position, and the tuning step (b) includes (b)(i) modifying the desired velocity.

12. The method of claim 11, wherein the modifying step (b)(i) includes (b)(ii) multiplying the desired velocity and the compromising factor.

13. The method of claim 11, wherein the velocity profile generator generates the desired velocity using a single velocity profile stored in a memory, and the single velocity profile is used for different values of the compromising factor.

14. A method of operating an apparatus comprising steps of:
    (a) receiving an acoustic adjusting factor, the apparatus being adapted to receive the acoustic adjusting factor externally;
    b) modifying at least one control parameter for only an actuator of the apparatus responsive to the acoustic adjusting factor; and
    (c) controlling the actuator using the at least one modified control parameter.

15. A method comprising steps of:
    (a) receiving an acoustic adjusting factor, the apparatus being adapted to receive the acoustic adjusting factor externally;
    (b) modifying at least one control parameter for a moveable arm of the apparatus responsive to the acoustic adjusting factor, wherein the modifying is independent of a modification of a control parameter associated with a spindle motor; and
    (c) controlling the moveable arm using the at least one modified control parameter.

16. The method of claim 15 wherein the step of modifying includes directly applying the acoustic adjusting factor to the at least one control parameter.

17. The method of claim 15 wherein the step of modifying includes converting the acoustic adjusting factor and applying the converted acoustic adjusting factor to the at least one control parameter.

* * * * *

Adverse Decision in Interference

Patent No. 6,704,159, Mingzhong Ding, Kiankeong Ooi, Yang Quan Chen, Jack Ming Teng, Shuang Quan Min, Beng Wee Quak, AUTOMATIC ACOUSTIC MANAGEMENT SYSTEM FOR A DISC DRIVE, Interference No. 105,436, final judgment adverse to the patentees rendered August 24, 2007, as to claims 1, 2, 3 and 14-17.

*(Official Gazette July 29, 2008)*